United States Patent

[11] 3,619,365

[72] Inventors Geoffrey Baguley
 Croft, Warrington, England;
 Daniel A. Shields, San Carlos, Calif.
[21] Appl. No. 745,608
[22] Filed July 17, 1968
[45] Patented Nov. 9, 1971
[73] Assignee United Kingdom Atomic Energy Authority
 London, England

[54] NUCLEAR REACTORS AND COOLANT THEREFOR
 4 Claims, 1 Drawing Fig.

[52] U.S. Cl. ................................................ 176/38, 176/92, 260/449.6
[51] Int. Cl. ............................................ G21c 15/28
[50] Field of Search ................................ 176/38, 92; 260/449.6

[56] References Cited
 UNITED STATES PATENTS
 3,108,051 10/1963 Lindstrom ................ 176/38
 3,427,221 2/1969 Campion .................. 176/92 X
 FOREIGN PATENTS
 1,381,937 11/1964 France ..................... 176/38
 1,102,764 2/1968 Great Britain ............. 176/38

Primary Examiner—Leland A. Sebastian
Assistant Examiner—Harvey E. Behrend
Attorney—Larson, Taylor and Hinds ABSTRACT: Carbon dioxide for the cooling of a carbon dioxide-cooled, graphite-moderated nuclear reactor is mixed with hydrogen and passed over a catalyst which promotes the reaction between carbon dioxide and hydrogen to produce methane. The hydrogen is obtained by electrolysis of water in plant which may also produce argon-free oxygen for consumption in a carbon monoxide/oxygen recombination unit, converting carbon monoxide formed in the coolant to carbon dioxide.

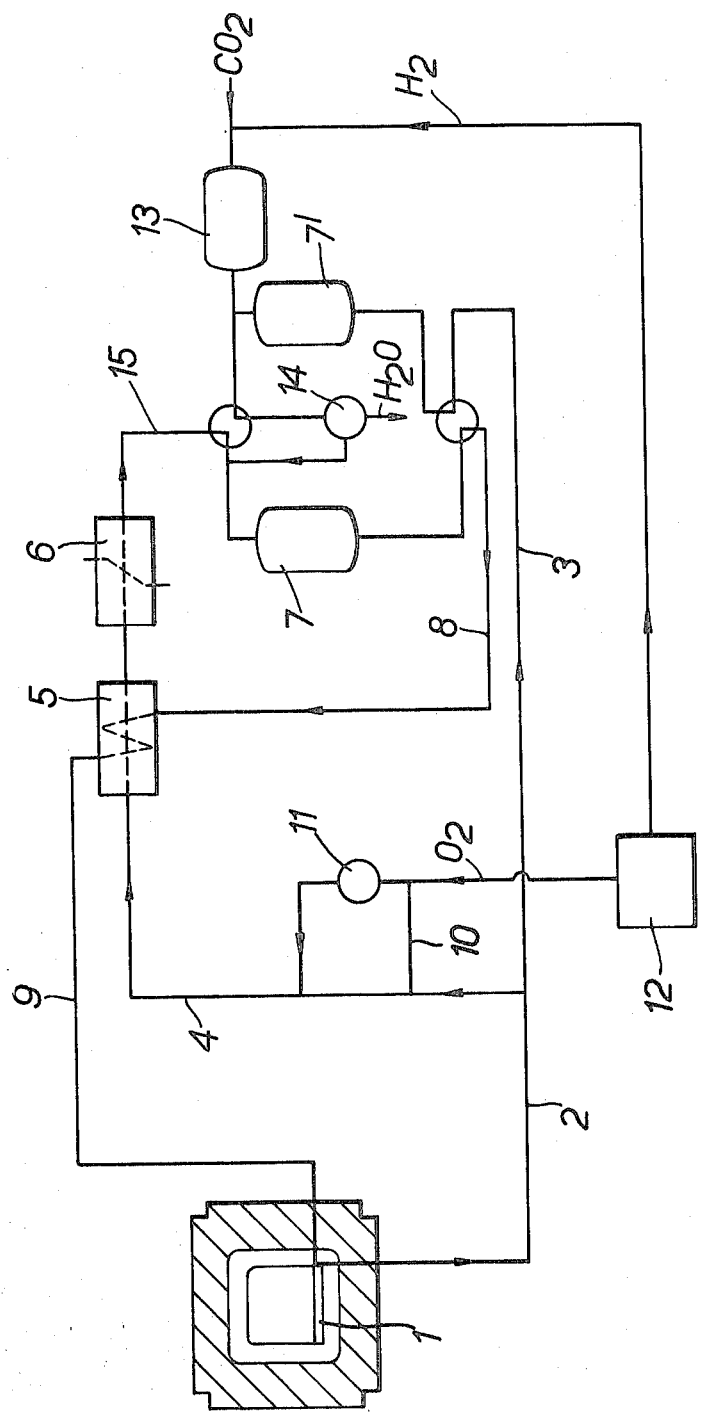

NUCLEAR REACTORS AND COOLANT THEREFOR

BACKGROUND OF THE INVENTION

This invention relates to nuclear reactors and to the coolant therefor.

In carbon dioxide-cooled, graphite-moderated nuclear reactors reaction occurs between the graphite and the carbon dioxide under irradiation, resulting in corrosion of the graphite, and it is considered desirable in highly-rated reactors to add small amounts of methane to the coolant in order to inhibit the graphite-carbon dioxide reaction. Methane is destroyed in the reactor however and may not always be available in the quantity and purity required for makeup; even if it is available it is expensive. Accordingly it has been suggested that methane should be produced from the radiolytic decomposition products of the carbon dioxide coolant and methane (that is to say, carbon monoxide, hydrogen and water) the reaction being promoted by passing the coolant over a suitable catalyst. It has further been suggested that the yield of methane may be increased by the addition of water to the circulating coolant before passing it over the catalyst.

SUMMARY OF THE INVENTION

According to the present invention carbon dioxide for the cooling of a carbon dioxide-cooled, graphite-moderated nuclear reactor is mixed with hydrogen and passed over a catalyst adapted to promote the reaction between carbon dioxide and hydrogen to produce methane, the hydrogen being obtained by electrolysis.

The electrolytic plant in which the hydrogen is produced may also produce argon-free oxygen for consumption in a carbon monoxide/oxygen recombination unit. Such a unit removes carbon monoxide from the coolant circulating through the reactor by converting the carbon monoxide to carbon dioxide. This carbon dioxide may be used as the feed to which hydrogen is added but it should be substantially freed of carbon monoxide by passing over copper oxide, for example, as carbon monoxide interferes with the reaction between hydrogen and carbon dioxide. In an alternative the hydrogen is added to a bleed from the carbon dioxide makeup feed line to the reactor coolant circuit. One suitable catalyst for promoting the reaction between carbon dioxide and hydrogen to produce methane is nickel. Catalyst temperatures of 300–400°C. are generally required. Water is produced in the reaction and the majority of this water is preferably removed before the feed is introduced into the main reactor coolant circuit. This may be done in a conventional water cooler and separator.

The proportions of hydrogen and carbon dioxide in the feed to the catalyst feed are selected to give the desired concentration of methane in the reactor coolant.

DESCRIPTION OF THE DRAWING

The invention will now be described with reference to the accompanying drawing which is a diagrammatic arrangement of an auxiliary coolant circuit for a nuclear reactor.

DESCRIPTION OF THE PREFERRED EMBODIMENT

In the drawing is shown a nuclear reactor 1. Carbon dioxide coolant leaves the reactor by duct 2 at the rate of 100,000 lbs./hr. Ten percent of this gas (10,000 lbs./hr.) is bled off by duct 3 for dryer regeneration as explained below. The remainder (90,000 lbs./hr.) is led by duct 4 through heat exchanger 5 and water cooler 6 then by duct 15 to dryer 7 before returning to the reactor via duct 8, heat exchanger 5 and duct 9. A further bleed line 10 takes 15,000 lbs./hr. of coolant through a carbon monoxide/oxygen recombination unit 11 after mixing with 44 lbs./hr. oxygen, the gas then being returned to cut 4. The oxygen is supplied from an electrolytic plant 12. The plant 12 also provides 5.5–6.0 lbs./hr. hydrogen to a catalyst bed 13 having a feed of 30 lbs./hr. carbon dioxide. The catalyst bed contains a nickel catalyst maintained at 300°–400° C. and the hydrogen and carbon dioxide react to produce methane in accordance with the equation:

$$CO_2 + 4H_2 \rightarrow CH_4 + 2H_2O$$

Water is also produced and most of this is removed in a water cooler and separator 14 before the feed gas joins duct 15 to pass through the dryer 7 and heat exchanger 5 to the reactor 1. A second dryer 7' is also provided. One dryer is regenerated while the other is in use. Regeneration is effected by passing the bleed of hot gas from duct 3 (10,000 lbs./hr.) through the dryer in the reverse direction to flow for drying, the wet gas then being passed through the water cooler and separator 14 with the feed gas of carbon dioxide and methane.

We claim:
1. In a method of inhibiting the reaction between a carbon dioxide coolant and a graphite moderator in a nuclear reactor, which method includes the introduction of methane into the coolant, the improvement comprising the steps of preparing hydrogen by electrolysis of water, mixing the hydrogen with carbon dioxide, passing the mixture over a catalyst adapted to promote the reaction between carbon dioxide and hydrogen to produce methane in the mixture, removing water from the methane-containing mixture, and feeding the resulting mixture to the nuclear reactor coolant circuit.

2. A method as claimed in claim 1 comprising the additional steps of also preparing oxygen by electrolysis of the water and feeding the oxygen and carbon dioxide coolant which has circulated through the reactor to a plant to convert to carbon dioxide carbon monoxide present in the coolant from the reactor.

3. A method as claimed in claim 2 wherein the carbon dioxide with which the hydrogen is mixed is taken from the output of the conversion plant.

4. A method as claimed in claim 1 wherein the hydrogen is added to the carbon dioxide feed to the reactor coolant.

* * * * *